United States Patent
Wachi

(10) Patent No.: US 6,208,472 B1
(45) Date of Patent: *Mar. 27, 2001

(54) LENS DRIVE CONTROL DEVICE AND IMAGE PICKUP APPARATUS HAVING THE SAME

(75) Inventor: Fumihito Wachi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/061,432

(22) Filed: Apr. 17, 1998

(30) Foreign Application Priority Data

Apr. 23, 1997 (JP) .................................................. 9-106071

(51) Int. Cl.[7] ..................................................... G02B 15/14
(52) U.S. Cl. .......................................... 359/697; 359/696
(58) Field of Search ..................................... 359/694, 696, 359/697, 698, 705, 823; 396/76–82, 84, 86, 87

(56) References Cited

U.S. PATENT DOCUMENTS

| | | | |
|---|---|---|---|
| 4,847,648 | * | 7/1989 | Yamaguchi et al. ................... 396/84 |
| 5,111,226 | * | 5/1992 | Nakamura et al. ..................... 396/76 |
| 5,270,766 | * | 12/1993 | Nakamura et al. ..................... 396/76 |
| 5,819,120 | | 10/1998 | Hamada et al. ....................... 396/77 |

* cited by examiner

Primary Examiner—Ricky Mack
(74) Attorney, Agent, or Firm—Robin, Blecker & Daley

(57) ABSTRACT

A lens drive control device includes a zoom lens, a drive mechanism for driving at least one lens unit which constitutes the zoom lens, a control circuit for controlling the drive mechanism, and a switch for switching between a shooting state and a non-shooting state of the zoom lens, wherein, when the zoom lens is switched from the non-shooting state to the shooting state by the switch, the control circuit causes the drive mechanism to drive the zoom lens to a zoom position other than a wide-angle end.

12 Claims, 14 Drawing Sheets

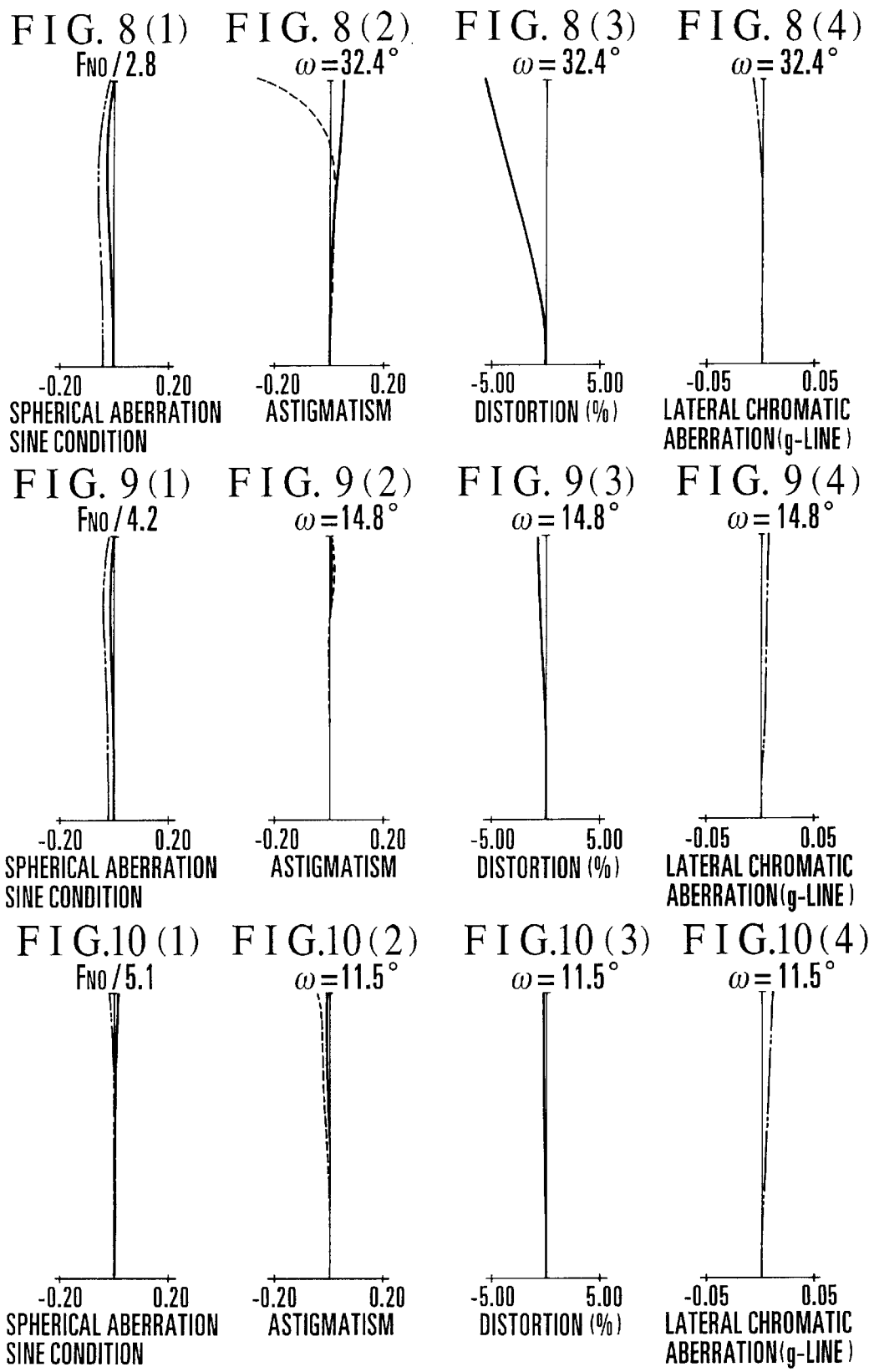

F I G. 12(A)
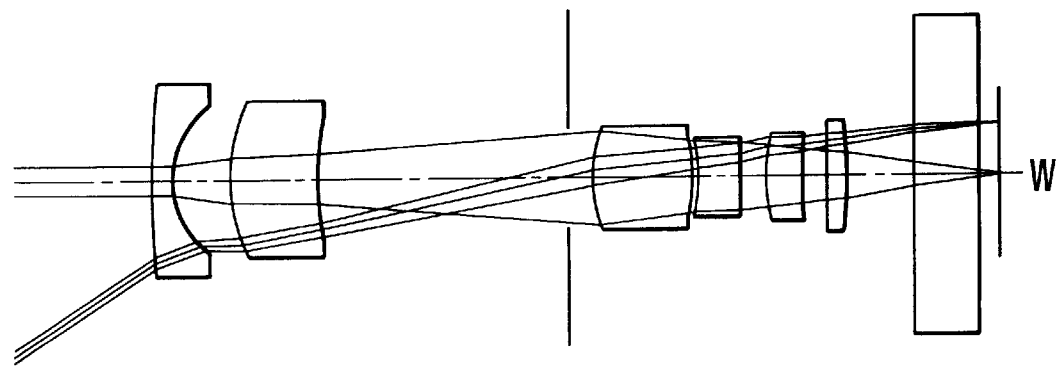
F I G. 12(B)
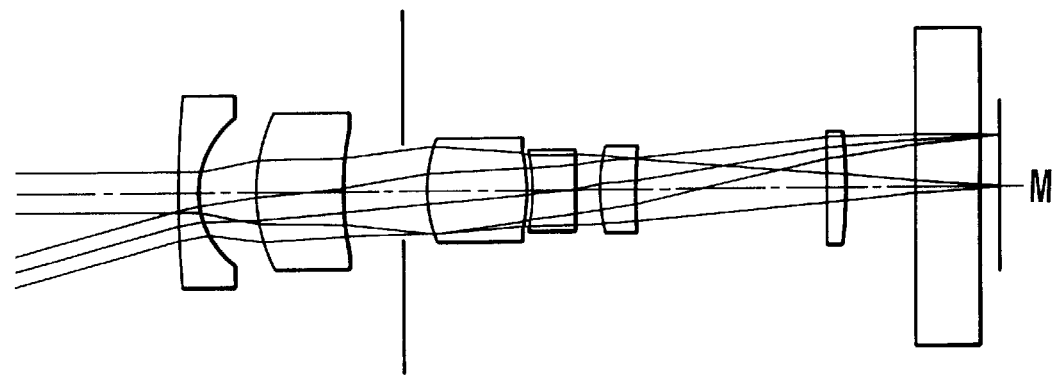
F I G. 12(C)
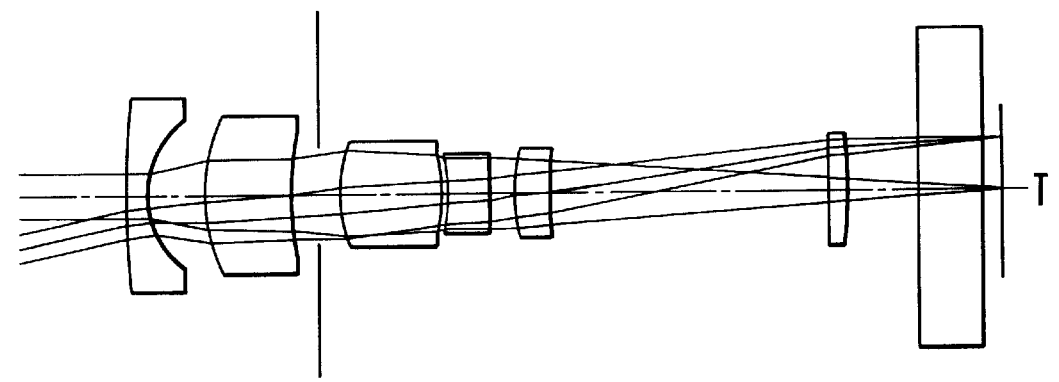

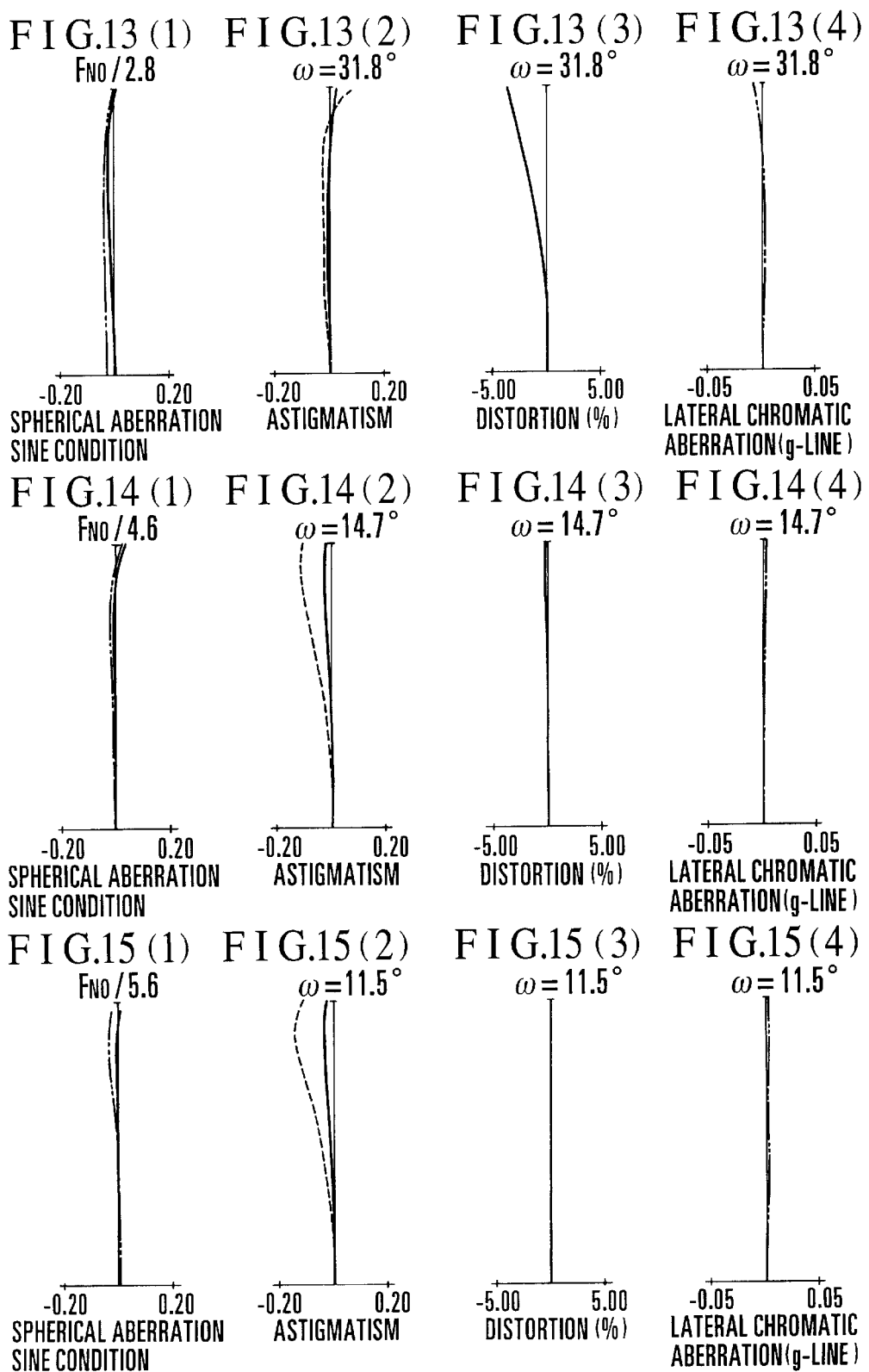

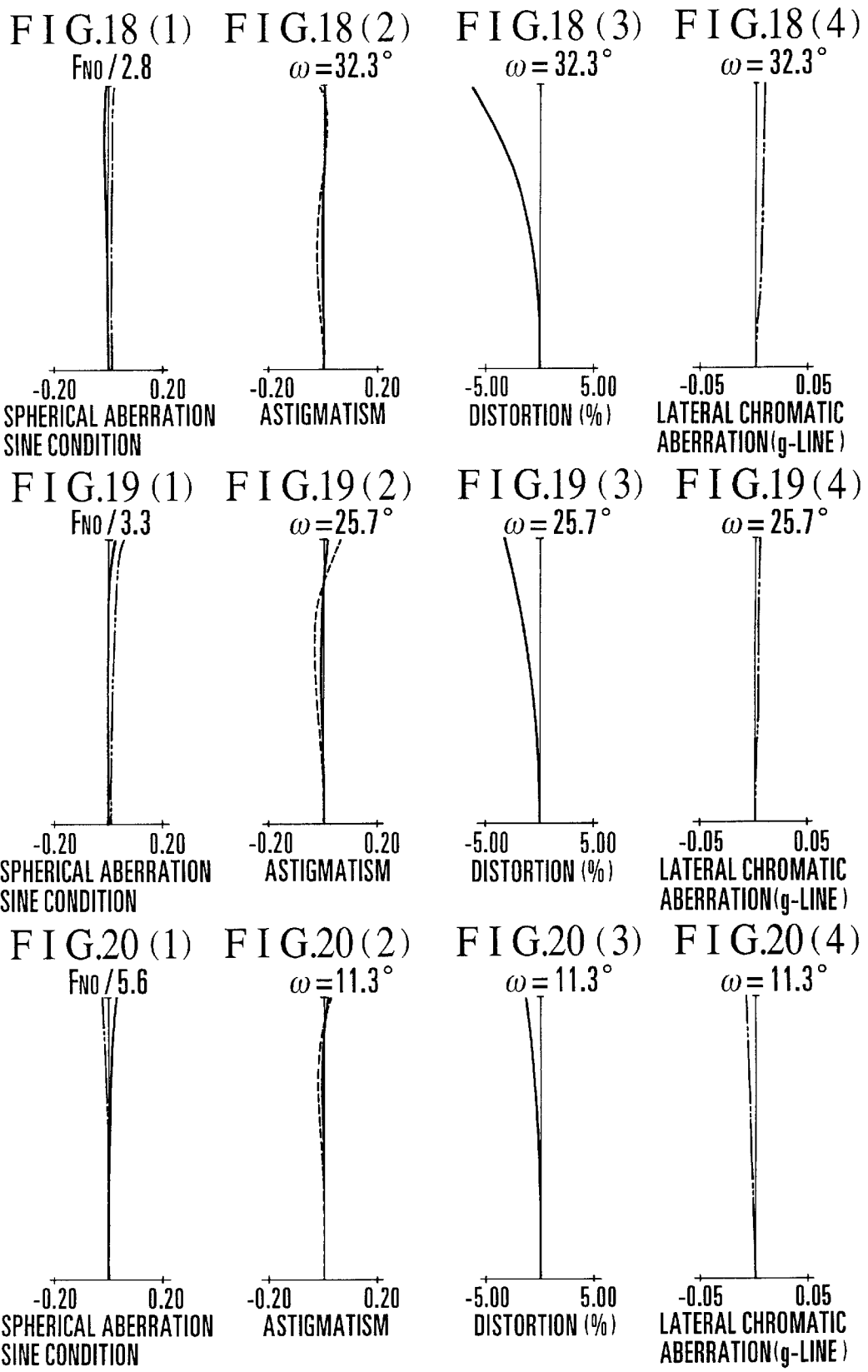

LENS DRIVE CONTROL DEVICE AND IMAGE PICKUP APPARATUS HAVING THE SAME

BACKGROUND OF THE INVENTION

1. Field of the Invention

The present invention relates to a lens drive control device and an image pickup apparatus using the lens drive control device and, more particularly, to a lens drive control device and an image pickup apparatus suited for use in small-sized electronic still cameras (e.g., digital cameras) having an image pickup element such as a CCD (charge-coupled device).

2. Description of Related Art

In recent years, the image pickup apparatus using an image pickup element such as a CCD have been widespread in the form of video cameras or electronic still cameras. These image pickup apparatus are capable of taking and storing a video image with ease. The stored video image can be viewed on the CRT (cathode-ray tube) or like display device or printed out as photographs.

However, the conventional video camera and electronic still camera trend is to take over the system of the silver-halide film camera without any considerable alteration. For the electronic still camera, some disadvantages arise in employing all the features of that system.

For example, lens drive systems which prevail in the lens-shutter-type silver-halide cameras have a common feature that, when switched from the non-shooting mode where the lens barrel is retracted into the camera body to the shooting mode, the zoom lens is driven to the wide-angle end in response to turning-on of the electric power supply. On the contrary, for the small-sized electronic still camera, there are occasions that such an initial setting is unfavorable.

An appropriate type of optical system to the small-sized electronic still camera is the negative lead type of zoom lens in which the front lens unit is negative in refractive power and the rear lens unit is positive in refractive power. In some cases, the physical length for the wide-angle end of the negative lead type of zoom lens becomes longer than for the telephoto end. With the zoom lens of such a form, when the electric power supply is turned on, it results that the initial setting process of the zoom lens goes to the wide-angle end after having once passed across the telephoto end. On the contrary, the electronic still camera has a feature that the telephoto end is rather more often enjoyed than the wide-angle end. This is because, when the electronic still camera is used as a document camera to read documents into the computer or to shoot personal name cards, the telephoto end is usually used at which the distortion is lesser than at the wide-angle end.

On consideration of such a usage of the electronic still camera, it is not always necessary to take the initial setting in the wide-angle end in response to turning-on of the power supply. Also, in the lens configuration described above, the initial setting process overruns the telephoto end which is rather high in the frequency of use. Therefore, the zoom lens is apt to be driven wastefully, thereby causing the premature consumption of the battery.

BRIEF SUMMARY OF THE INVENTION

An object of the present invention is to provide a lens drive control device which prevents the lens from being driven wastefully when the electric power supply is turned on, and an image pickup apparatus using the lens drive control device.

To attain the above object, in accordance with an aspect of the invention, there is provided a lens drive control device, which comprises a zoom lens, drive means for driving at least one lens unit which constitutes the zoom lens, control means for controlling the drive means, and a switch for switching between a shooting state and a non-shooting state of the zoom lens, wherein, when the zoom lens is switched from the non-shooting state to the shooting state by the switch, the control means causes the drive means to drive the zoom lens to a zoom position other than a wide-angle end.

In accordance with another aspect of the invention, there is provided a lens drive control device, which comprises a zoom lens in which a distance between a lens surface closest to an object side and a lens surface closest to an image side becomes minimum in a predetermined zoom position other than a wide-angle end, drive means for driving at least one lens unit which constitutes the zoom lens, control means for controlling the drive means, and a switch for switching between a shooting state and a non-shooting state of the zoom lens, wherein, when the zoom lens is switched from the non-shooting state to the shooting state by the switch, the control means causes the drive means to drive the zoom lens to the predetermined zoom position.

In accordance with a further aspect of the invention, there is provided a lens drive control device, which comprises a zoom lens, drive means for driving at least one lens unit which constitutes the zoom lens, control means for controlling the drive means, a switch for switching between a shooting state and a non-shooting state of the zoom lens, storage means for storing a zoom position taken when the zoom lens has been switched from the shooting state to the non-shooting state by the switch, and command means for issuing a command to read out the zoom position stored in the storage means, wherein, when the zoom lens is switched from the non-shooting state to the shooting state by the switch, if the command to read out the zoom position stored in the storage means is issued by the command means, the control means causes the drive means to drive the zoom lens to the zoom position stored in the storage means.

In accordance with a still further aspect of the invention, there is provided an image pickup apparatus having the lens drive control device described above.

These and further aspects and features of the invention will become apparent from the following description of preferred embodiments thereof taken in conjunction with the accompanying drawings.

BRIEF DESCRIPTION OF THE SEVERAL VIEWS OF THE DRAWING

FIGS. 8(1), 8(2), 8(3) and 8(4) are graphic representations of the aberrations of the numerical example 1 of the optical system in the wide-angle end.

FIGS. 9(1), 9(2), 9(3) and 9(4) are graphic representations of the aberrations of the numerical example 1 of the optical system in a middle focal length position.

FIGS. 10(1), 10(2), 10(3) and 10(4) are graphic representations of the aberrations of the numerical example 1 of the optical system in the telephoto end.

FIGS. 12(A), 12(B) and 12(C) are longitudinal section views of the numerical example 2 of the optical system in three operative positions.

FIGS. 13(1), 13(2), 13(3) and 13(4) are graphic representations of the aberrations of the numerical example 2 of the optical system in the wide-angle end.

FIGS. 14(1), 14(2), 14(3) and 14(4) are graphic representations of the aberrations of the numerical example 2 of the optical system in a middle focal length position.

FIGS. 15(1), 15(2), 15(3) and 15(4) are graphic representations of the aberrations of the numerical example 2 of the optical system in the telephoto end.

FIGS. 18(1), 18(2), 18(3) and 18(4) are graphic representations of the aberrations of the numerical example 3 of the optical system in the wide-angle end.

FIGS. 19(1), 19(2), 19(3) and 19(4) are graphic representations of the aberrations of the numerical example 3 of the optical system in a middle focal length position.

FIGS. 20(1), 20(2), 20(3) and 20(4) are graphic representations of the aberrations of the numerical example 3 of the optical system in the telephoto end.

DETAILED DESCRIPTION OF THE INVENTION

Hereinafter, preferred embodiments of the invention will be described in detail with reference to the drawings.

Figure 1:
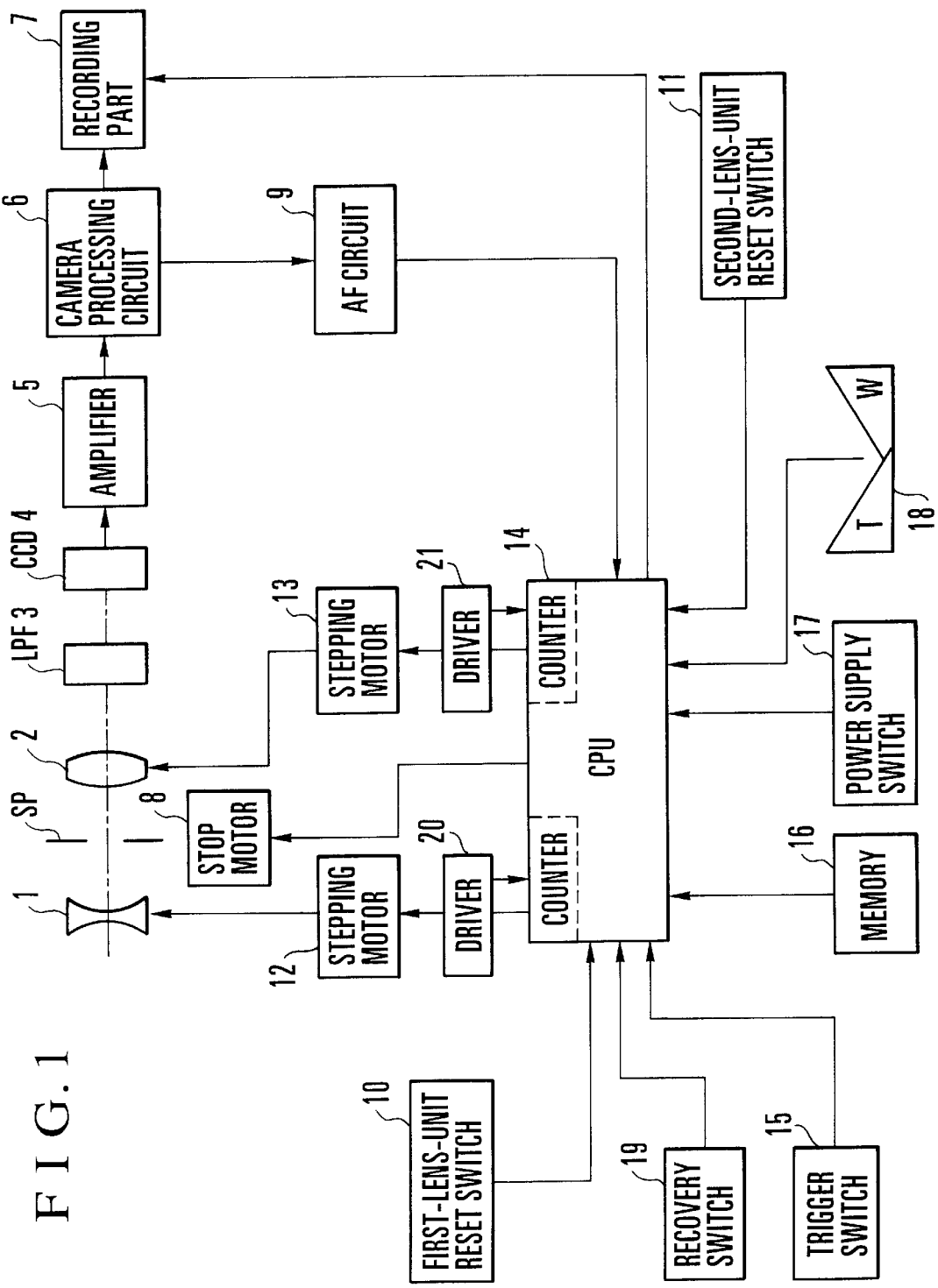
FIG. 1 is a block diagram of an image pickup apparatus having a lens drive control device according to an embodiment of the invention.

FIG. 1 is a block diagram showing an image pickup apparatus having a lens drive control device according to an embodiment of the invention.

Referring to FIG. 1, a first lens unit 1 has a negative refractive power. A second lens unit 2 has a positive refractive power. The first lens unit 1 acts as the compensator, while the second lens unit 2 acts as the variator. The first and second lens units 1 and 2 constitute a zoom lens. Incidentally, for the zoom lens configuration, many other types may be considered. So, it is to be understood that the zoom lens in the invention is not confined to the type shown in FIG. 1.

A stop SP, an optical low-pass filter 3 and an image sensor 4 such as interline-type CCD are included in the optical system. Light entering through the first lens unit 1 is adjusted in the intensity by the stop SP and passes through the second lens unit 2 and the low-pass filter 3 to form an image on the image sensor 4.

An amplifier 5 amplifies an output signal of the image sensor 4 and outputs the amplified output signal. A camera processing circuit 6 processes the output signal of the amplifier 5 as a video signal. The video signal outputted from the camera processing circuit 6 is supplied to a recording part 7, where the video signal is recorded on a recording medium. As the recording medium, a magnetic disc, a magnetic tape, a PC card, or a magneto-optical disc may be considered.

An electric motor 8 drives the stop SP, and is controlled by a CPU 14. An auto-focus (AF) circuit 9 determines a focusing state of the zoom lens at the present time on the basis of the video signal from the camera processing circuit 6 and outputs information on the focusing state to the CPU 14. In the image pickup apparatus in the present embodiment, the AF method to be used is assumed to take it as the in-focus position when a frequency component of the luminance component of the video signal reaches a peak, or the so-called the "TV signal" AF. Instead of this, the TCL type, or the infrared type may be used.

A focusing lens is driven to axially move in such a way as to make minute excursions on the basis of the information on the focusing state sent from the AF circuit 9. In the case of the embodiment, the focusing lens may be either the first lens unit 1 or the second lens unit 2. Otherwise, both of the lens units 1 and 2 may be used as the focusing lens. As the focusing lens is driven to minutely oscillate, the luminance signal of video signal obtained by the image sensor 4 oscillates in sysnchronism with the oscillation of the focusing lens. Such a luminance signal is transferred from the image sensor 4 through the camera processing circuit 6 and the AF circuit 9 to the CPU 14. When the luminance signal exceeds a certain value, the CPU 14 determines that an in-focus state has been attained and, then, stops the focusing lens from further excursion.

A reset switch 10 is provided for the first lens unit 1. When a counter disposed in the CPU 14 is used to measure the moving amount of the first lens unit 1, the reset switch 10 functions as a sensor for the reference position. Another reset switch 11 is provided for the second lens unit 2. When another counter disposed in the CPU 14 is used to measure the moving amount of the second lens unit 2, the reset switch 11 functions as a sensor for the reference position.

Stepping motors 12 and 13 function as drive means for moving the lens units 1 and 2, respectively. When the lens units 1 and 2 are moved to effect zooming, focusing, or retracting, the stepping motors 12 and 13 are energized through respective drivers 20 and 21.

The CPU 14 functions as a control means, and, in response to the respective input signals, controls the movements of the motor 8 for the stop SP, the stepping motors 12 and 13, an electronic shutter, and others. A trigger switch 15, when pushed, renders the CPU 14 to actuate the electronic shutter and the recording part 7 so that the video image formed on the image sensor 4 is taken in and recorded on the recording medium. A memory 16 temporarily stores information on the zoom position taken when the electric power supply is turned off.

A power supply switch 17, when closed, connects the electric power supply to the CPU 14. A zoom switch 18, when pushed to the wide-angle end, actuates the CPU 14 to command the drivers 20 and 21 so that zooming goes to the wide-angle end, or when pushed to the telephoto side, zooming goes to the telephoto side, or when not pushed, zooming does not take place.

A recovery switch 19 determines which zoom position is resumed as the zoom lens moves when the power supply switch 17 is turned on again, depending on its ON/OFF position. In the present embodiment, if the recovery switch 19 is in the ON position, setting is carried out so that the zoom lens is driven to the position stored in the memory 16 obtained when the power supply has been last turned off. If the recovery switch 19 is in the OFF position, the zoom lens is driven to a position where the overall lens length (distance from a lens surface closest to the object side to a lens surface closest to the image side) of the zoom lens becomes shortest.

Figure 2:
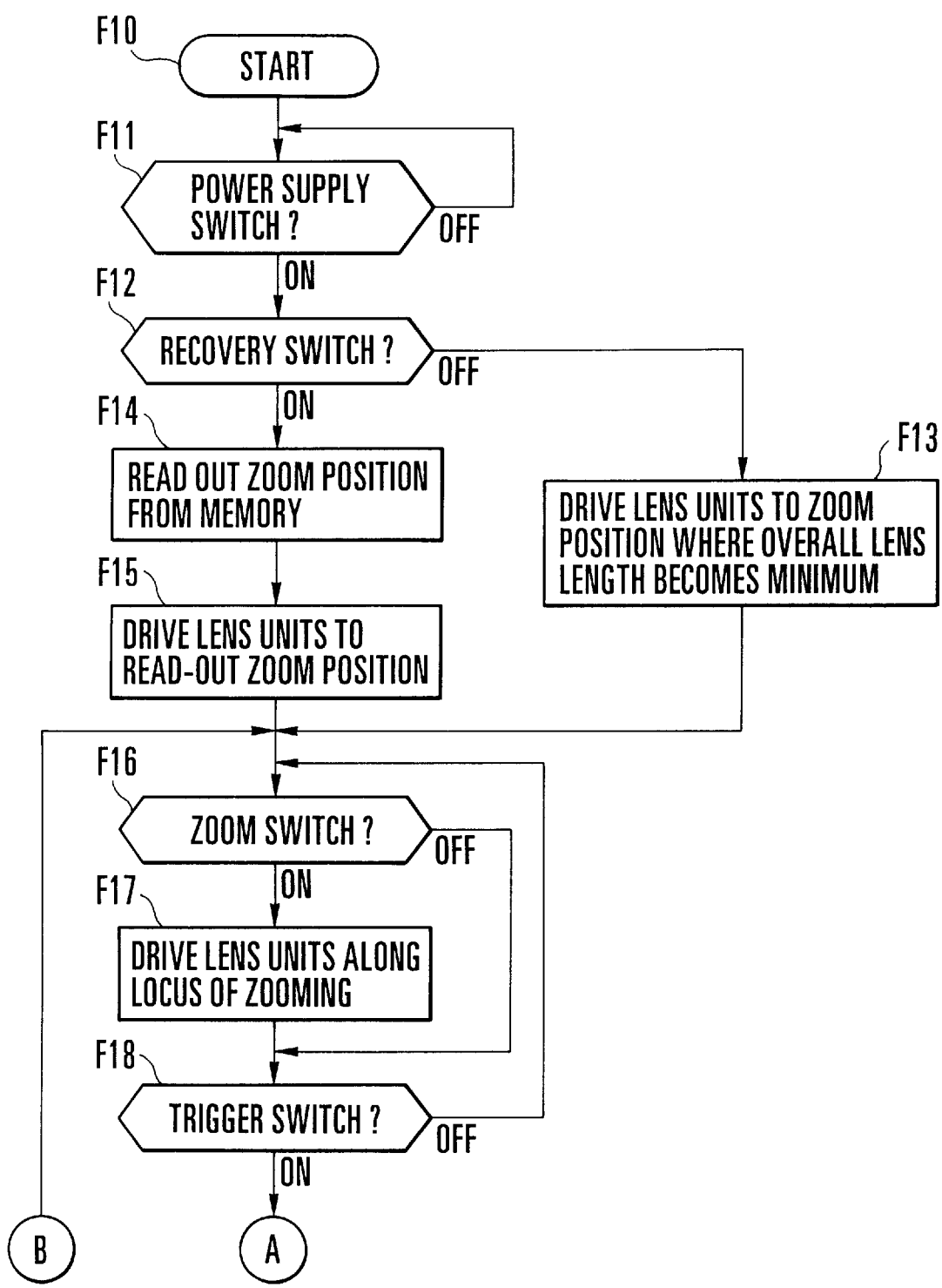
FIG. 2 is a flow chart for explaining an operation of the image pickup apparatus.
Figure 3:
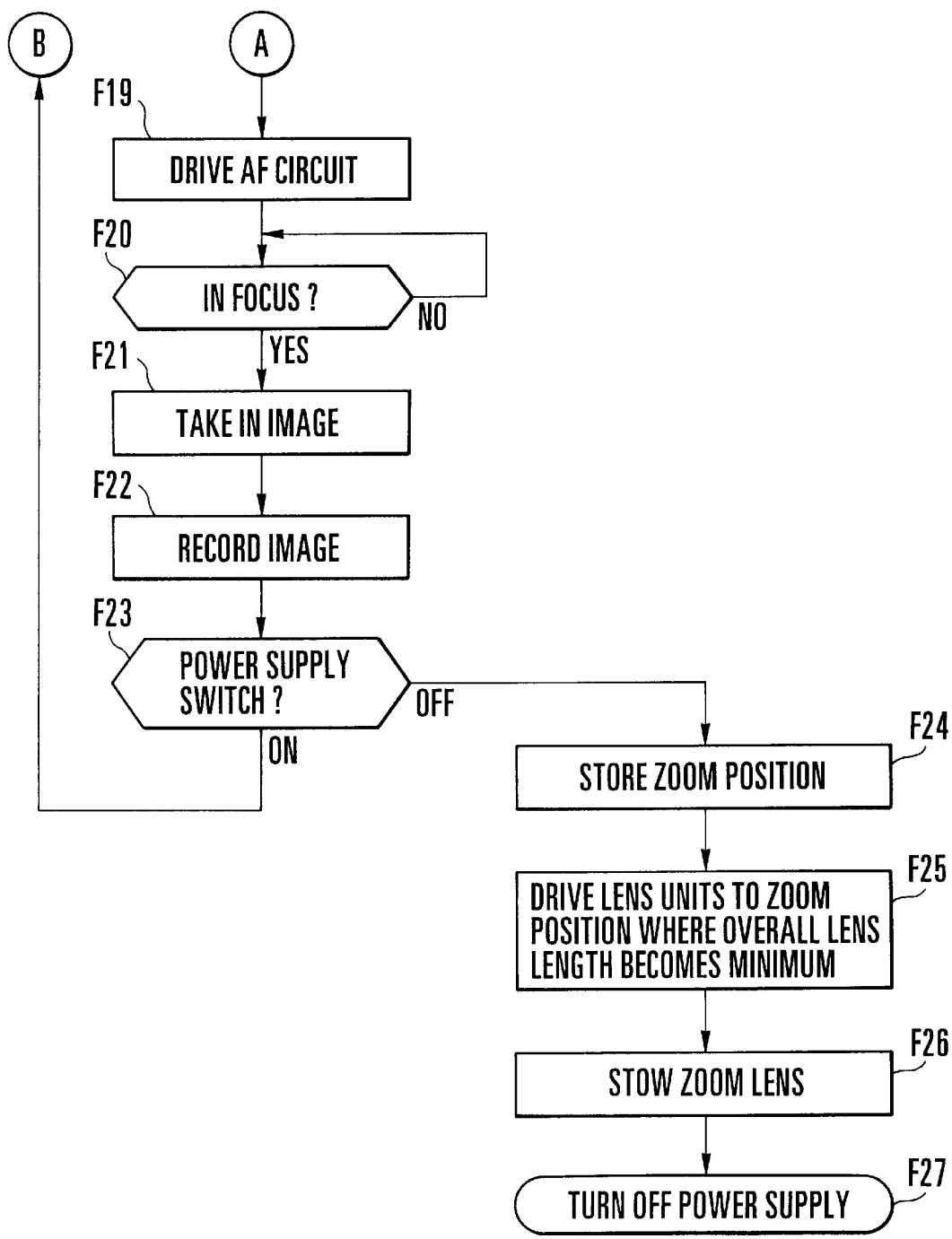
FIG. 3 is a flow chart for explaining the operation of the image pickup apparatus.

Next, an operation of the image pickup apparatus according to the embodiment is described with reference to flow charts shown in FIGS. 2 and 3.

After the flow of operation has started at a step F10, the ON/OFF of the power supply switch 17 is first determined. If the power supply switch 17 is in the on-state, the flow proceeds to a step F12, where the ON/OFF of the recovery switch 19 is determined.

If the recovery switch 19 is in the off-state, the flow proceeds to a step F13, where the lens units 1 and 2 are driven from the retracted position (stowage position) to the zoom positions where the overall lens length becomes shortest. Meanwhile, if the recovery switch 19 is in the on-state, the memory 19 is accessed at a step F14 to read out the zoom position stored. Then, at a step F15, the lens units 1 and 2 are driven to the read-out zoom position.

If the zoom switch 18 is found to be turned on (to either one of the wide-angle and telephoto sides) at a step F16, the flow proceeds to a step F17, where the lens units 1 and 2 are driven along their respective loci toward the wide-angle end or the telephoto end depending on the switched side of the zoom switch 18. If the zoom switch 18 is found to be turned off, the flow proceeds to a step F18, skipping the step F 17.

If, at the step F18, the trigger switch 15 is found to be turned on, the flow proceeds to a step F19, where the AF circuit 9 is driven to effect automatic focusing. If, at a step F20, an in-focus state is found to be attained, the flow proceeds to a step F21, where the video image is taken in. At the next step F22, the recording part 17 carries out recording of the video image on the recording medium. If the trigger switch 15 is found to be turned off, the flow returns to the step F16.

A step F23, a check is made to find the ON/OFF of the power supply switch 17. If the power supply switch 17 is found to be turned on, the flow returns to the step F16. If the power supply switch 17 is found to be turned off, the flow proceeds to a step F24, where the current zoom position is stored in the memory 16. At the next step F25, the lens units 1 and 2 are driven to the position where the overall lens length becomes shortest. Then, at a step F26, the zoom lens is stowed (retracted) into the camera body. Then, the power supply is turned off at a step F27.

Figure 4:
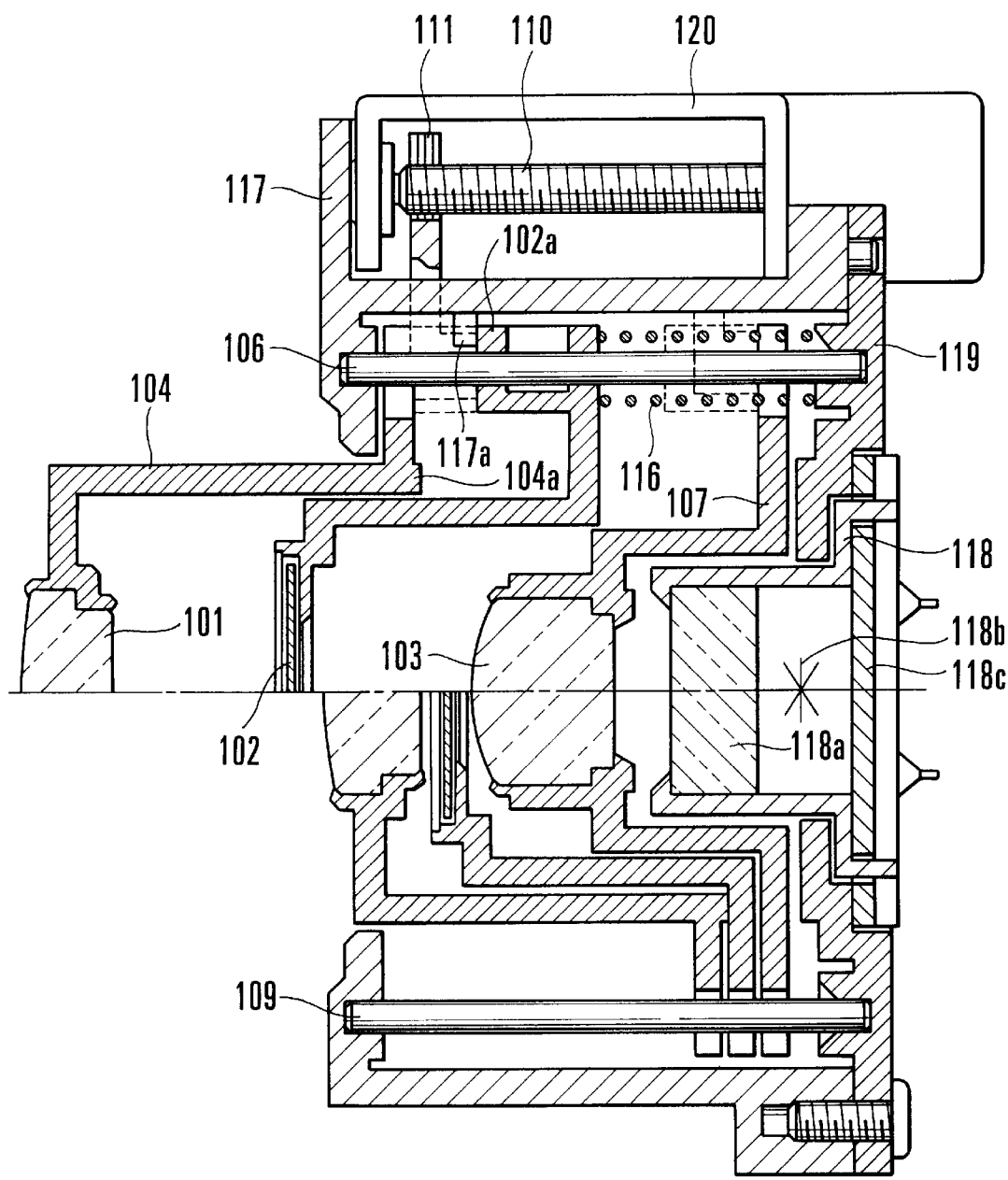
FIG. 4 is a sectional side view of a lens part of the image pickup apparatus.

Next, with reference to FIGS. 4 and 5, the structural arrangement of a lens part of the image pickup apparatus in the present embodiment is described below. FIG. 4 is a longitudinal side section view of the lens part and FIG. 4 is a front end view of the same.

Figure 5:
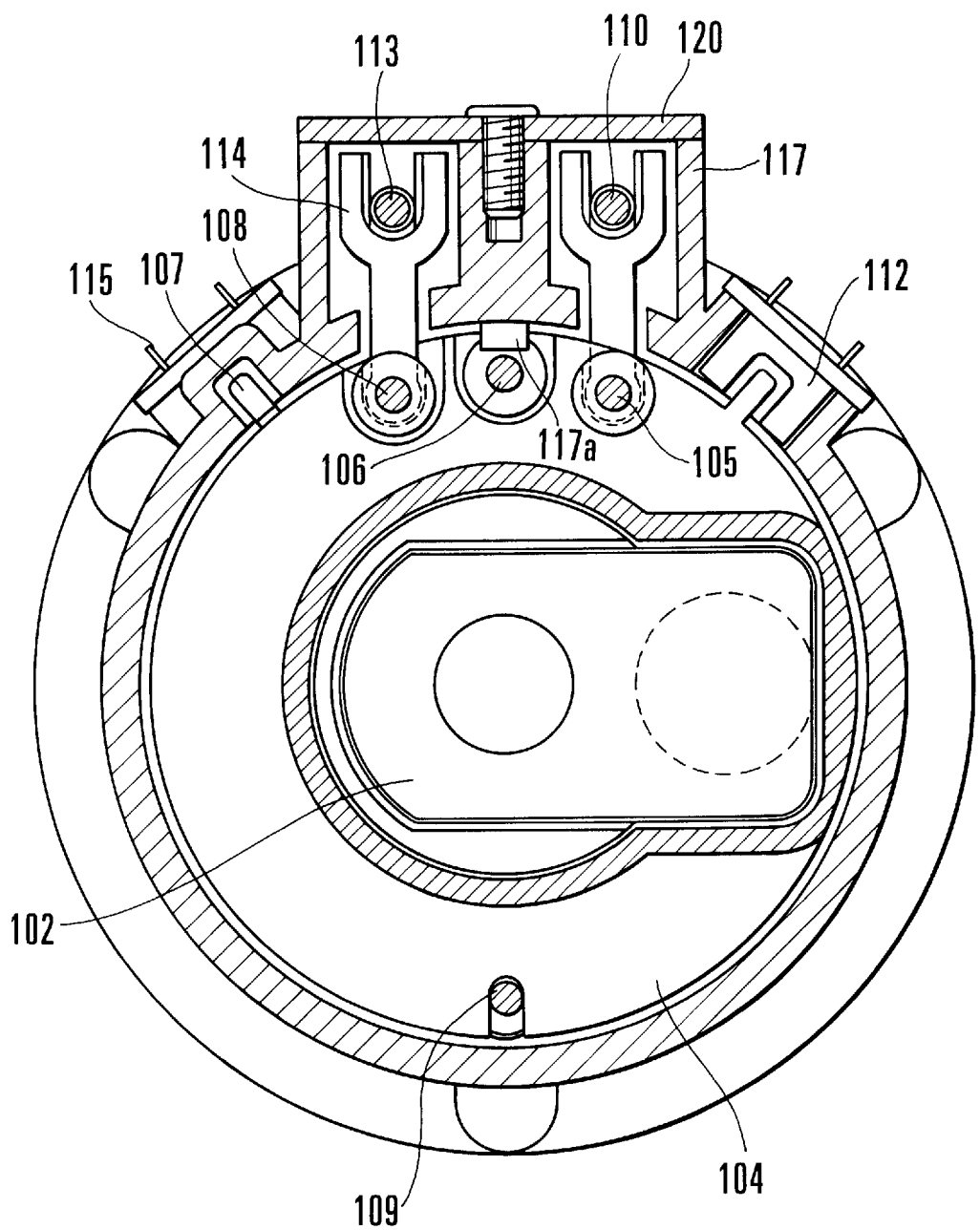
FIG. 5 is a front view of the lens part of the image pickup apparatus.

In FIGS. 4 and 5, an axially movable first lens unit 101, an axially movable diaphragm unit 102 and an axially movable second lens unit 103 correspond to the first lens unit 1, the stop SP and the second lens unit 2, respectively, shown in FIG. 1. A holding frame 104 holds the first lens unit 101. As the holding frame 104 moves axially, the holding frame 104 is restrained from rotation by a guide bar 105. The guide bar 105 has such a stroke as to cause the overall lens length of the zoom lens to become shorter in the non-shooting state than in the shooting state. Another guide bar 106 guides the diaphragm unit 102 to move along the optical axis, and has such a stroke as to cause the overall lens length of the zoom lens to become shorter in the non-shooting state than in the shooting state. A holding frame 107 holds the second lens unit 103. As the holding frame 107 moves axially, the holding frame 107 is restrained from rotation by a guide bar 108. The guide bar 105 has such a stroke as to cause the overall lens length of the zoom lens to become shorter in the non-shooting state than in the shooting state. A U bar 109 restrains the first holding frame 104, the diaphragm unit 102 and the second holding frame 107 from turning about the respective guide bars 105, 106 and 108 in the direction perpendicular to the optical axis, and has such a stroke as to cause the overall lens length of the zoom lens to become shorter in the non-shooting state than in the shooting state.

A stepping motor 110 is arranged to drive the holding frame 104 axially. A rack 111 transmits the driving force of the stepping motor 110 to the holding frame 104. A sensor 112 is arranged to detect the initial position of the first lens unit 101. Another stepping motor 113 is arranged to drive the second lens unit 103 axially. Another rack 114 transmits the driving force of the stepping motor 113 to the holding frame 107. Another sensor 115 is arranged to detect the initial position of the second lens unit 103. The stepping motors 110 and 113 correspond to the stepping motors 12 and 13 shown in FIG. 1, respectively, and the sensors 112 and 115 correspond to the reset switches 10 and 11 shown in FIG. 1, respectively.

A spring 116 urges the diaphragm unit 102 always toward the object side. A main tube 117 holds the guide bars 105, 106 and 108 and the bar 109 at their one ends, and fixedly carries the stepping motors 110 and 113 and the sensors 112 and 115.

A CCD unit 118 is integrally composed of a low-pass filter 118a and a chip 118c and has an image receiving surface 118b. The CCD unit 118 corresponds to a combination of the low-pass filter 3 and the image sensor 4 shown in FIG. 1.

A rear tube 119 holds the guide bars 105, 106 and 108 and the U bar 109 at their opposite ends and fixedly carries the CCD unit 118. The stepping motors 110 and 113 are mounted on a motor holding plate 120.

The upper half of FIG. 4 shows the state of the lens part in which the first lens unit 101 is in the most forward position. The lower half of FIG. 4 shows the state in which the lens part is in the retracted position. In moving the first lens unit 101 forward, the stepping motor 110 is energized to transmit its driving force to the rack 111. The driving force transmitted to the rack 111 causes the holding frame 104 to axially move forward. Along with the forward movement of the holding frame 111, the diaphragm unit 102 which is urged by the spring 116 toward the object side, too, is moved forward. The diaphragm unit 102, which is being moved forward, eventually abuts on a stopper 117a provided on the main tube 117 and stops from further moving forward, thus reaching the position of the upper half of FIG. 4. On the other hand, in moving the first lens unit 101 backward, the stepping motor 110 is energized in the reversed direction. So, the reverse driving force of the stepping motor 110 is transmitted to the rack 111 to move the holding frame 104 toward the image side. After a projection 104a of the holding frame 104, which is being moved backward, abuts on the diaphragm unit 102, the diaphragm unit 102, too, is moved backward together with the holding frame 104, thus reaching the position of the lower half of FIG. 4.

The driving force generated by the stepping motor 113 is transmitted through the rack 114 to the holding frame 107, thus axially moving the holding frame 107 backward and forward. The sensor 112 is arranged to detect the initial position of the holding frame 104 and the sensor 115 is arranged to detect the initial position of the holding frame 107. The sensors 112 and 115 send detection signals to a CPU (not shown in FIGS. 4 and 5), which corresponds to the CPU 14 shown in FIG. 1. The CPU controls the energization of the stepping motors 110 and 113 in accordance with the detection signals received.

Next, numerical examples 1 to 3 of optical systems suited for use in the lens drive control device in the present embodiment are shown. In the numerical data for the examples 1 to 3, ri is the radius of curvature of the i-th lens surface, when counted from the object side, di is the i-th lens thickness or air separation, when counted from the object side, ni is the refractive index of the material of the i-th lens element, when counted from the object side, and νi is the Abbe number of the material of the i-th lens element, when counted from the object side. The lens surface indicated by * is an aspheric surface, and in the numerical data there are also the values of the radius of the osculating sphere and the aspheric coefficients in the following polynomial:

$$X = \frac{h^2/R}{1 + \sqrt{1-(1+K)(h/R)^2}} + Bh^4 + Ch^6 + Dh^8$$

where X is the coordinate in the direction of the optical axis and h is the coordinate in the direction perpendicular to the optical axis, the direction in which light advances being taken as positive. R is the radius of the osculating sphere, and K, B, C and D are the aspheric coefficients. Also, the notation D-0X means $10^{31 X}$.

Numerical Example 1:

f = 3.74849  Fno = 1:2.8  2ω = 64.8°

| | | | |
|---|---|---|---|
| r1 = 205.814 | d1 = 1.00 | n1 = 1.74330 | ν1 = 49.2 |
| *r2 = 3.621 | d2 = 1.35 | | |
| r3 = 6.370 | d3 = 2.10 | n2 = 1.64769 | ν2 = 33.8 |
| r4 = 46.696 | d4 = Variable | | |
| r5 = ∞(Stop) | d5 = Variable | | |
| r6 = 4.880 | d6 = 2.20 | n3 = 1.83400 | ν3 = 37.2 |
| r7 = -76.972 | d7 = 0.18 | | |
| r8 = -20.357 | d8 = 1.60 | n4 = 1.84666 | ν4 = 23.8 |
| r9 = 3.588 | d9 = 0.11 | | |
| r10 = 3.929 | d10 = 1.90 | n5 = 1.73077 | ν5 = 40.6 |
| *r11 = -84.003 | d11 = Variable | | |
| r12 = ∞ | d12 = 3.10 | n6 = 1.51633 | ν6 = 64.2 |
| r13 = ∞ | | | |

| | Focal Length | | |
|---|---|---|---|
| Variable Separation | 3.75 | 8.55 | 11.02 |
| d4 | 11.74 | 2.17 | 1.20 |
| d5 | 6.69 | 2.61 | 1.20 |
| d11 | 2.00 | 5.62 | 7.49 |

Aspheric Coefficients:

| For r2: | R = 3.62053D+00 | K = -1.06318D+00 |
|---|---|---|
| | B = 1.10799D-03 | C = -3.27073D-06 |
| For r11: | R = -8.40029D+01 | K = -2.06156D+02 |
| | B = 2.51718D-03 | C = 1.50000D-04 |

Numerical Example 2:

f = 3.75003  Fno = 1:2.8  2ω = 63.60

| | | | |
|---|---|---|---|
| r1 = 60.170 | d1 = 1.00 | n1 = 1.74330 | ν1 = 49.2 |
| *r2 = 3.472 | d2 = 2.78 | | |
| r3 = 8.363 | d3 = 4.13 | n2 = 1.84666 | ν2 = 23.8 |
| r4 = 17.062 | d4 = Variable | | |
| r5 = ∞(Stop) | d5 = 1.10 | | |
| r6 = 6.211 | d6 = 4.78 | n3 = 1.69680 | ν3 = 55.5 |
| r7 = -10.395 | d7 = 0.31 | | |
| r8 = -6.817 | d8 = 2.00 | n4 = 1.84666 | ν4 = 23.8 |
| r9 = -2163.195 | d9 = 1.20 | | |
| r10 = 10.043 | d10 = 1.60 | n5 = 1.73077 | ν5 = 40.6 |
| *r11 = 21.256 | d11 = Variable | | |
| r12 = 154.453 | d12 = 1.00 | n6 = 1.80400 | ν6 = 46.6 |
| r13 = -23.948 | d13 = 3.10 | | |
| r14 = ∞ | d14 = 3.10 | n7 = 1.51633 | ν7 = 64.2 |
| r15 = ∞ | | | |

| | Focal Length | | |
|---|---|---|---|
| Variable Separation | 3.75 | 8.60 | 11.10 |
| d4 | 11.85 | 2.69 | 1.10 |
| d11 | 1.12 | 9.04 | 13.12 |

Aspheric Coefficients:

| For r2: | R = 3.47155D+00 | K = -1.52122D+00 |
|---|---|---|
| | B = 2.11152D-03 | C = -1.34125D-05 |
| For r11: | R = 2.12556D+01 | K = 6.49763D+01 |
| | B = 3.59566D-04 | C = -5.36520D-05 |

Numerical Example 3:

f = 3.75000  Fno = 1:2.8  2ω = 64.60

| | | | |
|---|---|---|---|
| r1 = -1580.189 | d1 = 1.00 | n1 = 1.58313 | ν1 = 59.4 |
| *r2 = 2.786 | d2 = 1.85 | | |
| r3 = 5.844 | d3 = i.50 | n2 = 1.84666 | ν2 = 23.8 |
| r4 = 10.648 | d4 = Variable | | |
| r5 = ∞(Stop) | d5 = 1.10 | | |
| r6 = 5.328 | d6 = 2.10 | n3 = 1.58313 | ν3 = 59.4 |
| r7 = -11.129 | d7 = 0.30 | | |
| r8 = -44.181 | d8 = 1.00 | n4 = 1.84666 | ν4 = 23.8 |
| r9 = 6.765 | d9 = 0.38 | | |
| *r10 = -17.497 | d10 = 1.50 | n5 = 1.80610 | ν5 = 40.9 |
| r11 = -6.978 | d11 = Variable | | |
| r12 = 12.184 | d12 = 1.50 | n6 = 1.51633 | ν6 = 64.1 |
| r13 = -51.853 | d13 = 3.10 | | |
| r14 = ∞ | d14 = 3.10 | n7 = 1.51633 | ν7 = 64.2 |
| r15 = ∞ | | | |

| | Focal Length | | |
|---|---|---|---|
| Variable Separation | 3.75 | 8.60 | 11.10 |
| d4 | 11.85 | 2.69 | 1.10 |
| d11 | 1.12 | 9.04 | 13.12 |

Aspheric Coefficients:

| For r2: | R = 2.78636D+00 | K = -6.97078D-91 |
|---|---|---|
| | B = -4.78910D-04 | C = 1.77019D-05 |
| | D = -1.64098D-06 | |
| For r10: | R = 5.32776D+00 | K = -9.08473D-01 |
| | B = -7.94778D-04 | C = -1.82429D-06 |
| | D = -1.44616D-06 | |

Figure 6:
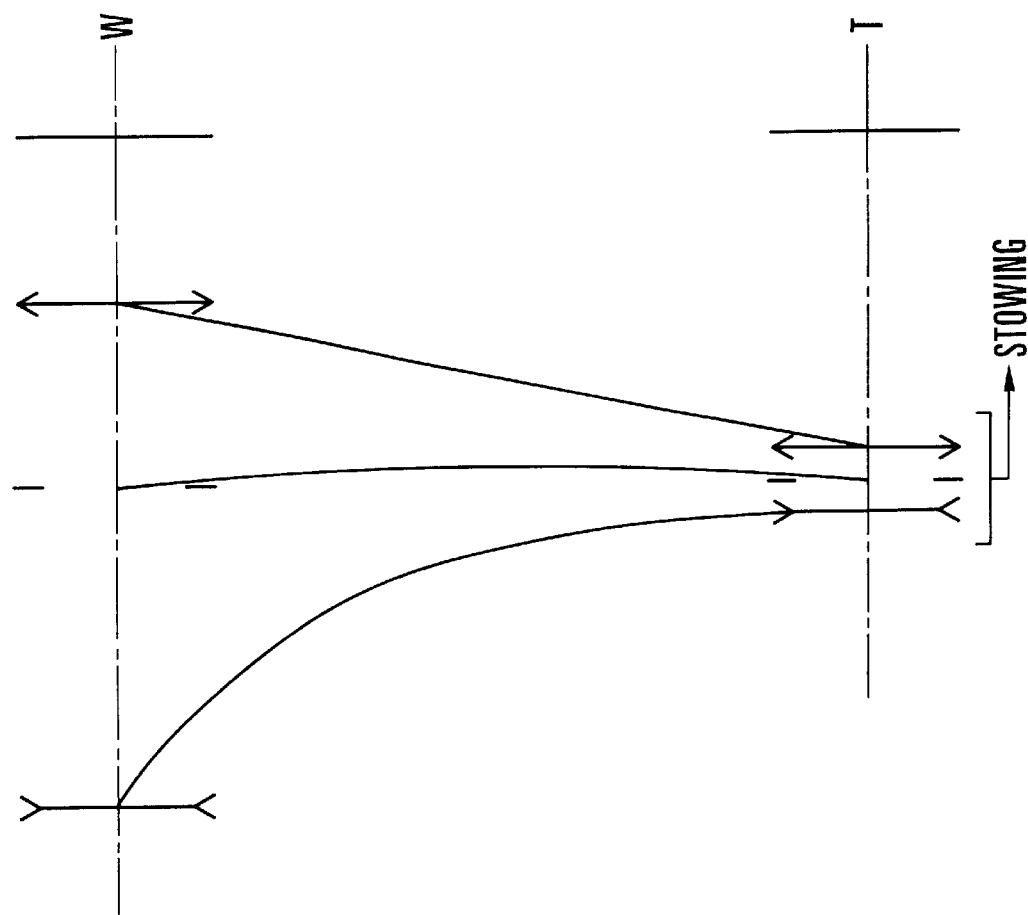
FIG. 6 is a diagram showing the zooming movements of lens units of a numerical example 1 of an optical system in the embodiment of the invention.

FIG. 6 shows the total zooming movement of each of the lens units in the paraxial zone of the numerical example 1. The optical system of the numerical example 1 is of the 2-unit type with the minus-plus refractive power arrangement. The negative first lens unit as the compensator and the positive second lens unit as the variator are moved in differential relation to vary the focal length.

As is apparent from FIG. 6, in the numerical example 1, the overall lens length (a distance between a lens surface closest to the object side and a lens surface closest to the image side) of the zoom lens is shortest in the telephoto end. In application of the invention to the optical system of the numerical example 1, it is, therefore, desirable that the retraction starts from the telephoto end and, when the power supply is turned on, the zoom lens first moves to the telephoto end.

Figure 7A:
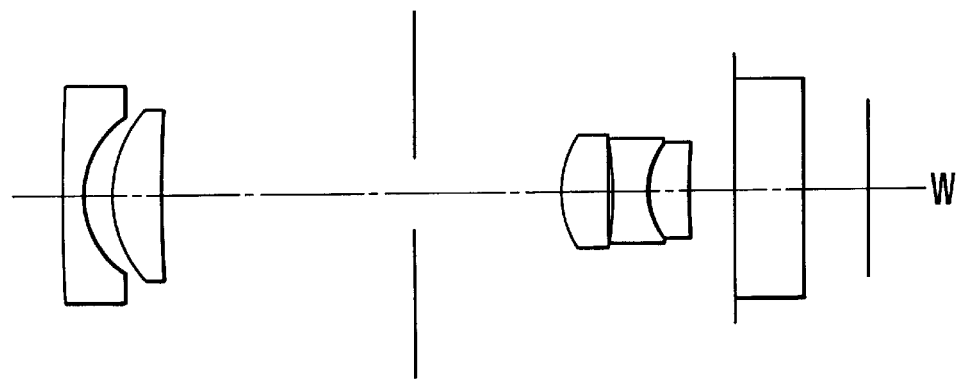
FIGS. 7(A), 7(B) and 7(C) are longitudinal section views of the numerical example 1 of the optical system in three operative positions.
Figure 7B:
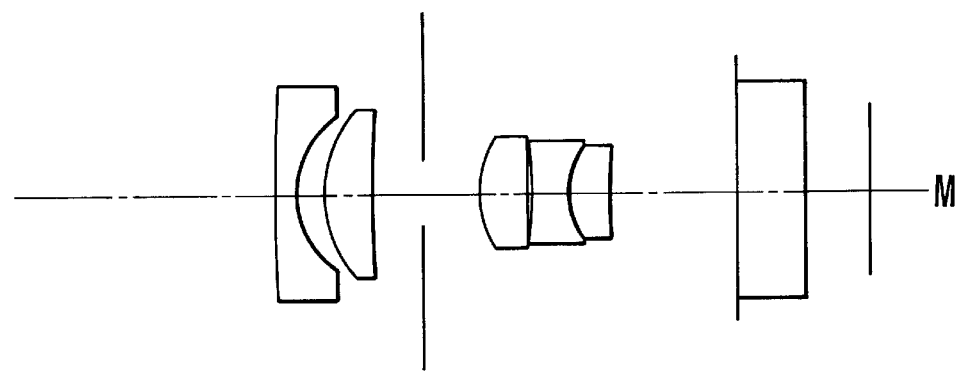
Figure 7C:
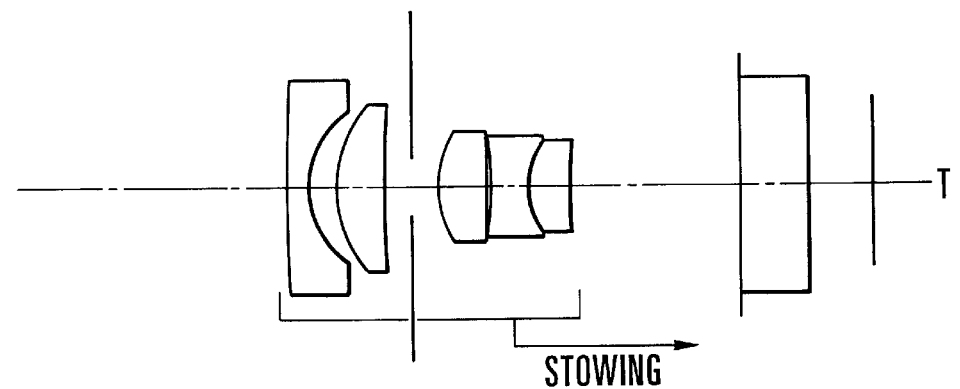

FIGS. 7(A), 7(B) and 7(C) are longitudinal section views of the numerical example 1 of the optical system in three zoom positions. The overall lens length of the zoom lens is shortest in the telephoto end as shown in FIG. 6. FIGS. 8(1), 8(2), 8(3) and 8(4) to FIGS. 10(1), 10(2), 10(3) and 10(4) are graphic representations of the aberrations of the numerical example 1 of the optical system in the respective zoom positions indicated in FIGS. 7(A), 7(B) and 7(C). FIGS. 8(1) to 8(4) are in the wide-angle end, FIGS. 9(1) to 9(4) are in a middle focal length position, and FIGS. 10(1) to 10(4) are in the telephoto end.

Figure 11:
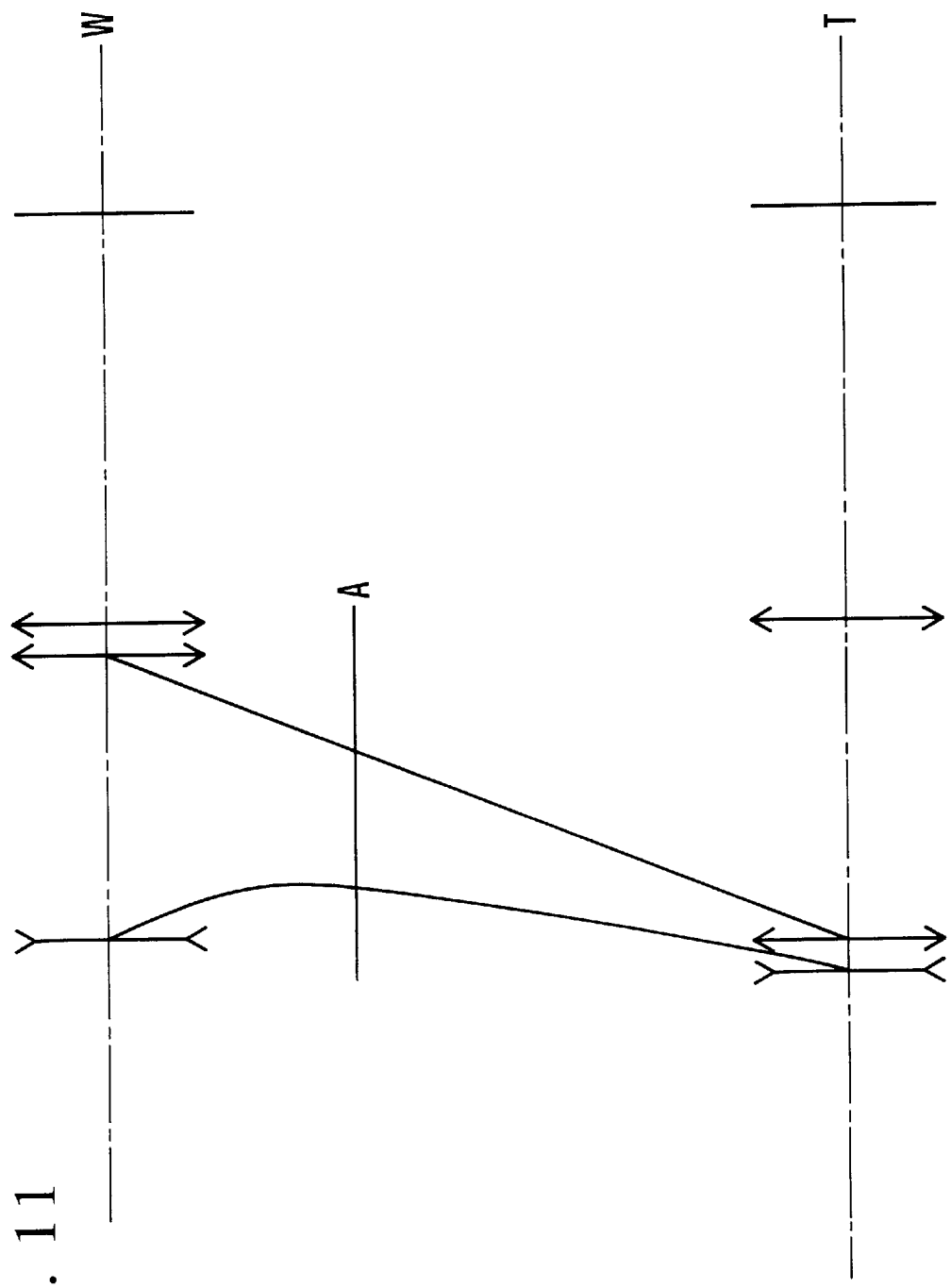
FIG. 11 is a diagram showing the zooming movements of lens units of a numerical example 2 of an optical system in the embodiment of the invention.

FIG. 11 shows the total zooming movement of each of the lens units of the numerical example 2. The optical system of the numerical example 2 is of the 3-unit type with the minus-plus-plus refractive power arrangement. The negative first lens unit and the positive second lens unit are moved in differential relation to vary the focal length.

As is apparent from FIG. 11, in the numerical example 2, the overall lens length of the zoom lens is shortest in a zoom position indicated by A. In application of the invention to the numerical example 2, it is, therefore, desirable that the retraction starts from the zoom position A, and when the power supply is turned on, the zoom lens first moves to the zoom position A.

FIGS. 12(A), 12(B) and 12(C) are longitudinal section views of the numerical example 2 of the optical system in three zoom positions. The overall lens length of the zoom lens is shortest neither in the wide-angle end nor in the telephoto end, but in a certain zoom position for the middle focal length. FIGS. 13(1), 13(2), 13(3) and 13(4) to FIGS. 15(1), 15(2), 15(3) and 15(4) are graphic representations of the aberrations in the respective zoom positions shown in FIGS. 12(A), 12(B) and 12(C). FIGS. 13(1) to 13(4) are in the wide-angle end, FIGS. 14(1) to 14(4) are in the middle focal length position, and FIGS. 15(1) to 15(4) are in the telephoto end.

Figure 16:
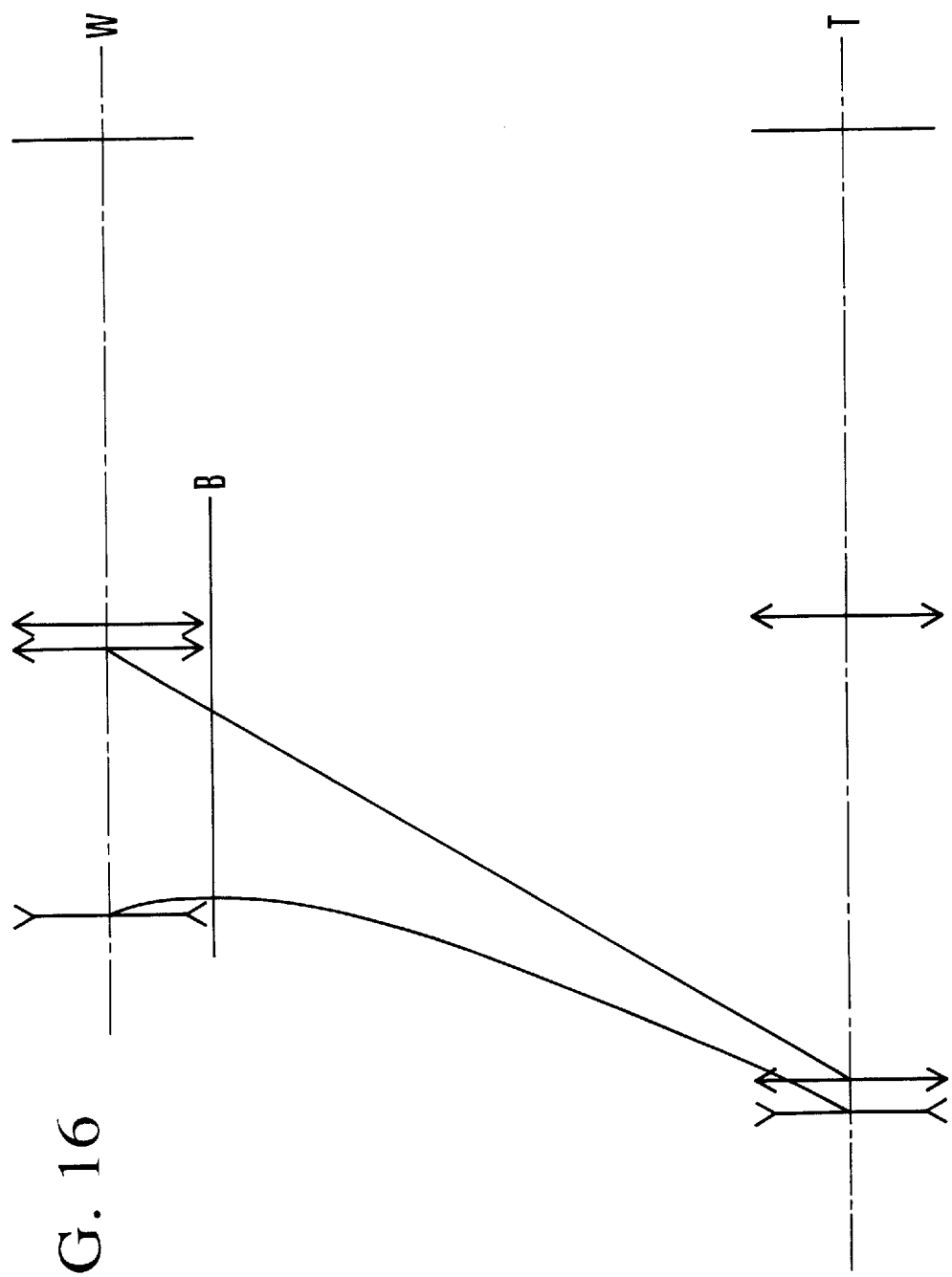
FIG. 16 is a diagram showing the zooming movements of lens units of a numerical example 3 of an optical system in the embodiment of the invention.

FIG. 16 shows the total zooming movement of each of the lens units of the numerical example 3. The optical system of the numerical example 3 is of the 3-unit type with the minus-plus-plus refractive power arrangement. The negative first lens unit and the positive second lens unit are moved in differential relation to vary the focal length.

As is apparent from FIG. 16, in the numerical example 3, the overall lens length of the zoom lens is shortest in a zoom position indicated by B. In application of the invention to the numerical example 3, it is, therefore, desirable that the retraction starts from the zoom position B, and when the power supply is turned on, the zoom lens first moves to the zoom position B.

Figure 17A:
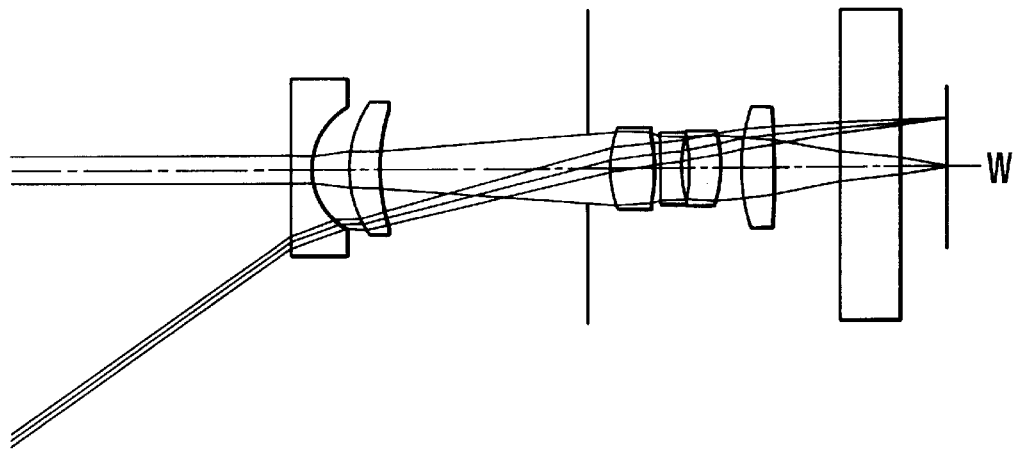
FIGS. 17(A), 17(B) and 17(C) are longitudinal section views of the numerical example 3 of the optical system in three operative positions.
Figure 17B:
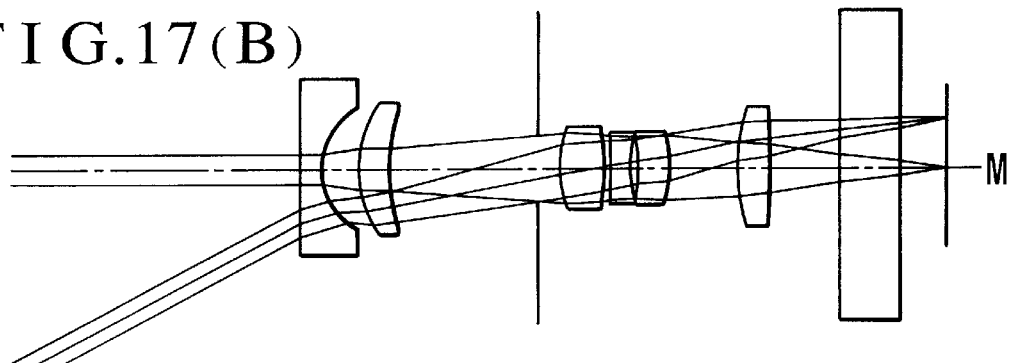
Figure 17C:
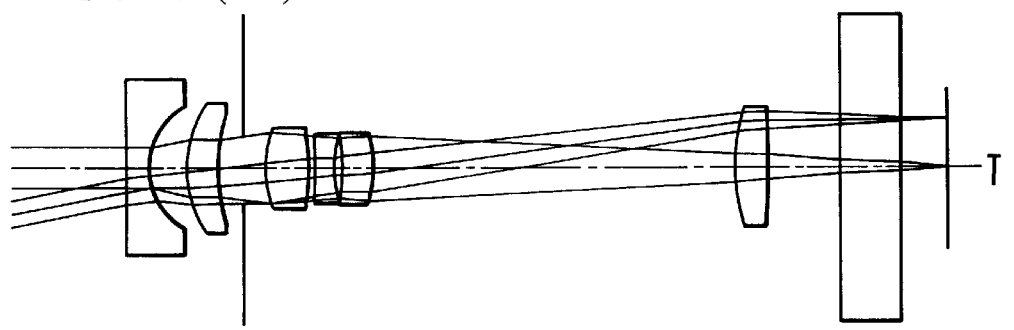

FIGS. 17(A), 17(B) and 17(C) are longitudinal section views of the numerical example 3 of the optical system in three zoom positions. The overall lens length of the zoom lens is shortest neither in the wide-angle end nor in the telephoto end, but in a certain zoom position for the middle focal length. FIGS. 18(1), 18(2), 18(3) and 18(4) to FIGS. 20(1), 20(2), 20(3) and 20(4) are graphic representations of the aberrations in the respective zoom positions indicated by FIGS. 17(A), 17(B) and 17(C). FIGS. 18(1) to 18(4) are in the wide-angle end, FIGS. 19(1) to 19(4) are in a middle focal length position, and FIGS. 20(1) to 20(4) are in the telephoto end.

The image pickup apparatus in the present embodiment, when the power supply is turned on, moves the lens from the retracted position to that zoom position which compromises the minimum distance and the high frequency of use. Therefore, the shooting state can be quickly made up. Also, since the zoom position taken when the power supply has been turned off at the last time is stored, the zoom lens can be moved to the stored zoom position, if necessary, when the power supply is turned on again. Therefore, the wasteful driving of the zoom lens can be reduced. So, the consumption of the battery in the image pickup apparatus can be reduced.

As has been described above, in the lens drive control device and the image pickup apparatus according to the embodiment of the invention, the wasteful lens driving can be reduced when the power supply is turned on.

What is claimed is:

1. A lens drive control device comprising:
    a zoom lens having a first lens unit of negative refractive power located closest to the object, said first lens unit moving along a locus convex toward the image during the power variation from a wide angle end to a telephoto end;
    drive means for driving at least one lens unit which constitutes said zoom lens;
    control means for controlling said drive means; and
    a switch for switching between a shooting state and a non-shooting state of said zoom lens,
    wherein, when said zoom lens is switched from the non-shooting state to the shooting state by said switch, said control means causes said drive means to drive said zoom lens to a zoom position other than a wide-angle end.

2. A lens drive control device according to claim 1, wherein said zoom lens comprises, in order from an object side to an image side, a first lens unit of negative refractive power and a second lens unit of positive refractive power.

3. A lens drive control device according to claim 1, wherein said zoom lens comprises, in order from an object side to an image side, a first lens unit of negative refractive power, a second lens unit of positive refractive power and a third lens unit of positive refractive power.

4. A lens drive control device according to claim 1, further comprising:
    storage means for storing a zoom position taken when said zoom lens has been switched from the shooting state to the non-shooting state by said switch; and
    command means for issuing a command to read out the zoom position stored in said storage means,
    wherein, when said zoom lens is switched from the non-shooting state to the shooting state by said switch, if the command to read out the zoom position stored in said storage means is issued by said command means, said control means causes said drive means to drive said zoom lens to the zoom position stored in said storage means.

5. A lens drive control device comprising:
    a zoom lens in which a distance between a lens surface closest to an object side and a lens surface closest to an image side becomes minimum in a predetermined zoom position other than a wide-angle end;
    drive means for driving at least one lens unit which constitutes said zoom lens;
    control means for controlling said drive means; and
    a switch for switching between a shooting state and a non-shooting state of said zoom lens,
    wherein, when said zoom lens is switched from the non-shooting state to the shooting state by said switch, said control means causes said drive means to drive said zoom lens to the predetermined zoom position.

6. A lens drive control device according to claim 5, wherein said zoom lens comprises, in order from the object side to the image side, a first lens unit of negative refractive power and a second lens unit of positive refractive power.

7. A lens drive control device according to claim 5, wherein said zoom lens comprises, in order from the object side to the image side, a first lens unit of negative refractive power, a second lens unit of positive refractive power and a third lens unit of positive refractive power.

8. A lens drive control device according to claim 5, further comprising:

storage means for storing a zoom position taken when said zoom lens has been switched from the shooting state to the non-shooting state by said switch; and command means for issuing a command to read out the zoom position stored in said storage means, wherein, when said zoom lens is switched from the non-shooting state to the shooting state by said switch, if the command to read out the zoom position stored in said storage means is issued by said command means, said control means causes said drive means to drive said zoom lens to the zoom position stored in said storage means.

9. A lens drive control device comprising:

a zoom lens;

drive means for driving at least one lens unit which constitutes said zoom lens;

control means for controlling said drive means;

a switch for switching between a shooting state and a non-shooting state of said zoom lens;

storage means for storing a zoom position taken when said zoom lens has been switched from the shooting state to the non-shooting state by said switch; and command means for issuing a command to read out the zoom position stored in said storage means, wherein, when said zoom lens is switched from the non-shooting state to the shooting state by said switch, if the command to read out the zoom position stored in said storage means is issued by said command means, said control means causes said drive means to drive said zoom lens to the zoom position stored in said storage means.

10. An image pickup apparatus comprising a lens drive control device according to one of claims 1 to 9.

11. An image pickup apparatus according to claim 10, further comprising:

an image pickup element which takes in an image formed by said zoom lens.

12. A lens drive control device, comprising:

a zoom lens composed of plural lens units, on lens unit closest ot the object of said plural lens unit being positioned closest to the image at the predetermined zoom positioned other than the wide angle end;

driving means for driving at least one lens unit which constitutes said zoom lens;

control means for controlling said drive means; and a switch for switching between a shooting state and a non-shooting state of said zoom lens, wherein, when said zoom lens is switched from the non-shooting state to the shooting state by said switch, said control means causes said drive means to drive said zoom lens to a zoom position other than a wide-angle end.

* * * * *

UNITED STATES PATENT AND TRADEMARK OFFICE
CERTIFICATE OF CORRECTION

PATENT NO.      : 6,208,472 B1
APPLICATION NO. : 09/061432
DATED           : March 27, 2001
INVENTOR(S)     : Fumihito Wachi It is certified that error appears in the above-identified patent and that said Letters Patent is hereby corrected as shown below:

Col. 12, line 16, delete "on" and insert --one--.
Col. 12, line 17, delete "ot" and insert --to--; delete "unit" and insert --units--.
Col. 12, line 18, delete "at the" and insert --at a--.
Col. 12, line 19, delete "positioned" and insert --position--.

Signed and Sealed this

Twelfth Day of February, 2008

JON W. DUDAS
*Director of the United States Patent and Trademark Office*